US009000939B2

(12) United States Patent
Sitka et al.

(10) Patent No.: US 9,000,939 B2
(45) Date of Patent: Apr. 7, 2015

(54) MUD POWERED INERTIA DRIVE OSCILLATING PULSER

(75) Inventors: Mark A. Sitka, Richmond, TX (US); Kristopher Sherrill, Humble, TX (US); Daniel Winslow, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 391 days.

(21) Appl. No.: 13/545,356

(22) Filed: Jul. 10, 2012

(65) Prior Publication Data

US 2013/0076527 A1 Mar. 28, 2013

(51) Int. Cl.
*G01V 3/00* (2006.01)
*G01V 11/00* (2006.01)
*E21B 47/06* (2012.01)
*E21B 47/18* (2012.01)

(52) U.S. Cl.
CPC ............ *G01V 11/002* (2013.01); *E21B 47/06* (2013.01); *E21B 47/18* (2013.01)

(58) Field of Classification Search
None
See application file for complete search history.

(56) References Cited

U.S. PATENT DOCUMENTS

| | | | |
|---|---|---|---|
| 2,700,131 A * | 1/1955 | Alder et al. | 324/323 |
| 3,820,389 A | 6/1974 | Richter, Jr. et al. | |
| 3,837,223 A | 9/1974 | Richter, Jr. et al. | |
| 3,908,770 A | 9/1975 | Richter, Jr. et al. | |
| RE30,246 E | 4/1980 | Richter, Jr. et al. | |
| 5,357,483 A | 10/1994 | Innes | |
| 5,517,464 A | 5/1996 | Lerner et al. | |
| 5,583,827 A | 12/1996 | Chin | |
| 5,586,084 A | 12/1996 | Barron et al. | |
| 7,280,432 B2 | 10/2007 | Hahn et al. | |
| 7,327,634 B2 | 2/2008 | Perry et al. | |
| 7,405,998 B2 | 7/2008 | Webb et al. | |
| 7,808,859 B2 | 10/2010 | Hahn et al. | |
| 2004/0262043 A1 | 12/2004 | Schaaf | |
| 2005/0000733 A1 | 1/2005 | Schaaf | |
| 2008/0055110 A1 | 3/2008 | Hahn et al. | |
| 2011/0061936 A1 * | 3/2011 | Bui et al. | 175/57 |

FOREIGN PATENT DOCUMENTS

EP 535815 B1 4/1996

OTHER PUBLICATIONS

Authorized Officer Philippe Becamel, PCT International Preliminary Report on Patentability, PCT/US1022/053476, Apr. 10, 2014, 7 pages.
Authorized officer Lee W. Young, International Search Report and Written Opinion of the International Searching Authority in PCT/US 11/53476, mailed Jan. 18, 2012, 8 pages.

* cited by examiner

*Primary Examiner* — Firmin Backer
*Assistant Examiner* — Shawna M Kingston
(74) *Attorney, Agent, or Firm* — Alan Bryson; Fish & Richardson P.C.

(57) ABSTRACT

A mud pulse telemetry tool is used in a drill string that has a drilling fluid flowing inside. The mud pulse telemetry tool may include a pulser disposed in the drill string and a drive system for driving the pulser. The pulser may include a non-rotating mud pulse stator and a mud pulse rotor disposed proximate to the stator. The drive system may include a turbine stator, a turbine rotor, and a rotatable inertial member magnetically coupled to the turbine rotor. The inertial member may be operatively connected at a first end to the mud pulse rotor. In the mud pulse telemetry tool, rotational energy may be transmitted from the turbine rotor to the rotatable inertial member by a magnetic coupling. The rotatable inertial member may be operatively connected to a supplemental motor that is adapted to supplement rotational energy imparted to the rotatable inertial member by the drive system.

12 Claims, 7 Drawing Sheets

Section A-A
FIG. 3

Section A-A Partial View

FIG. 3A

Section B-B

MUD POWERED INERTIA DRIVE OSCILLATING PULSER

CLAIM OF PRIORITY

Under 35 U.S.C. §119, this application claims the benefit of a foreign priority application, serial number PCT/US2011/053476, filed Sep. 27, 2011, the entire contents of which is hereby incorporated by reference.

BACKGROUND

This disclosure relates to measurement while drilling (MWD) and, more specifically, a mud pulse telemetry tool and method of use.

MWD is a system to perform drilling related measurements downhole and transmit data to the surface while drilling a well, usually used in the oil and gas industry. Mud pulse telemetry is a common method of data acquisition and transmission used in MWD tools. A downhole valve may operate to restrict the flow of the drilling mud, causing a series of pressure fluctuations that transmit the characteristic information up the wellbore to the surface receiver. The pressure fluctuation propagates via the drilling fluid towards the surface and is received by pressure sensors at or proximal to the earth's surface. The received pressure signals are processed to reconstruct the characteristic information. The pressure fluctuation can be created as a form of a positive pulse, a negative pulse, and a continuous wave. These forms can be generated with an oscillating valve that closes and/or opens to cause drilling fluid pressure to increase and/or decrease. For example, a positive pulse is generated with a brief closure of the valve to restrict the drilling fluid within the drilling pipe to cause an increase of the drilling fluid pressure. A downhole tool/device that generates such mud pulse pressure is referred to in the art as a mud pulser.

In many instances, a high rate mud pulser for downhole telemetry in subterranean wells is desired because higher data transfer rate increases measurement resolution and amount of more detailed formation and directional information to support faster penetration rate. For example, a common sampling rate of 4 bits per second (bps) at a drilling rate of 10 ft/min provides 24 bit/ft, whereas a 40 bps rate at 100 ft/min provides the same data rate per foot drilled. The present disclosure describes a high rate mud pulser that uses a mud powered inertia drive that accelerates the movement of the downhole valve to achieve an increased data rate.

SUMMARY

The present disclosure relates to a mud pulser that generates mud fluid pressure fluctuation during drilling in a subterranean well. In a general aspect, a mud pulse telemetry tool is used in a drill string that has a drilling fluid flowing inside. The mud pulse telemetry tool may include a pulser disposed in the drill string and a drive system for driving the pulser. The pulser may include a non-rotating mud pulse stator and a mud pulse rotor disposed proximate to the stator. The drive system may include a turbine stator, a turbine rotor, and a rotatable inertial member magnetically coupled to the turbine rotor. The inertial member may be operatively connected at a first end to the mud pulse rotor.

In some specific aspects, in the mud pulse telemetry tool, rotational energy may be transmitted from the turbine rotor to the rotatable inertial member by a magnetic coupling. The rotatable inertial member may be operatively connected at a second end to a supplemental motor that is adapted to supplement rotational energy imparted to the rotatable inertial member by the drive system. The mud pulse telemetry tool may further include a gear set disposed intermediate between the mud pulse rotor and the turbine rotor. The gear set may have a first rotational input member and at least one rotational output member. The gear set may be adapted to transmit rotational energy from the turbine rotor to the mud pulse rotor.

In some specific aspects, the gear set may further include at least one intermediate gear member disposed between the input member and the output member of the gear set. The mud pulse telemetry tool may further include at least one clutch operatively connected to the at least one intermediate gear member of the gear set. A number of clutches may be adapted to transfer synchronized bursts of rotational energy from the rotatable inertial member to the mud pulse rotor.

A rotational speed sensor may be included and adapted to output data on the rotational speed of the rotatable inertial member to a processor. The processor may calculate and output a signal to activate at least one clutch to engage and transfer rotational energy from the rotatable inertial member to the mud pulse rotor. The processor may calculate a time period for the clutch to engage based on the input data on the speed of rotation and mass of the rotatable inertia member.

The mud pulse telemetry tool may further include an elastically deformable torsion bar disposed between the torsion bar base and the mud pulse rotor shaft. The torsion bar may be deform and store elastic energy when the bar is transmitting torque from the torsion bar base to the mud pulse rotor, and release the stored elastic energy to provide a reverse rotation recovering torque.

In another general aspect, the present disclosure describes a method of mud pulse telemetry for use in a drill string having a drilling fluid flowing inside. The method includes disposing a mud pulse telemetry tool in the drill string. The mud pulse telemetry tool may include a pulser that has a non-rotating mud pulse stator and a mud pulse rotor positioned proximate to the stator, and a drive system that has a turbine stator, a turbine rotor and a rotatable inertial member. The drilling fluid is flown down the drill string and through the mud pulse telemetry tool. The turbine rotor may be rotating with drilling fluid flowing through the telemetry tool. The rotatable inertia member may be rotating by magnetic coupling of the member to the rotating turbine rotor of the drive system and store potential energy. The rotatable inertia member may transmit rotational energy to the mud pulse rotor. The mud pulse rotor may then be accelerated in a controllable rotationally oscillating motion to obstruct flow of the drilling fluid through the mud pulse stator to generate a plurality of positive pressure pulses in the drilling fluid in the drill string.

In more specific aspects, the method may further include rotating a supplemental motor coupled to the rotatable inertia member to add rotational energy to the rotatable inertia member. A number of clutches may be provided in a gear set for transferring synchronized bursts of rotational energy from the rotatable inertial member to the mud pulse rotor. Data that includes the rotational speed of the rotating inertia member from a rotational speed sensor may be output and received in a processor, which calculates and outputs an activation signal for at least one clutch. The at least one clutch, after receiving the activation signal, may engage to transfer rotational energy from the rotatable inertia member to the mud pulse rotor. A time period for the clutch to engage may be calculated based on the input data of the speed of rotation and mass of the rotatable inertia member.

The method may further include reducing ramp up time for rotating the mud pulse rotor by utilizing potential energy stored in the rotating rotatable inertia member. Additional clutches may also be provided to reduce recharge time of the clutch. An elastic deformable torsion bar may be provided to couple to the mud pulser. The mud pulser may be rotating from an oscillated position back to a neutral position by using the elastic energy stored in the torsion bar.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
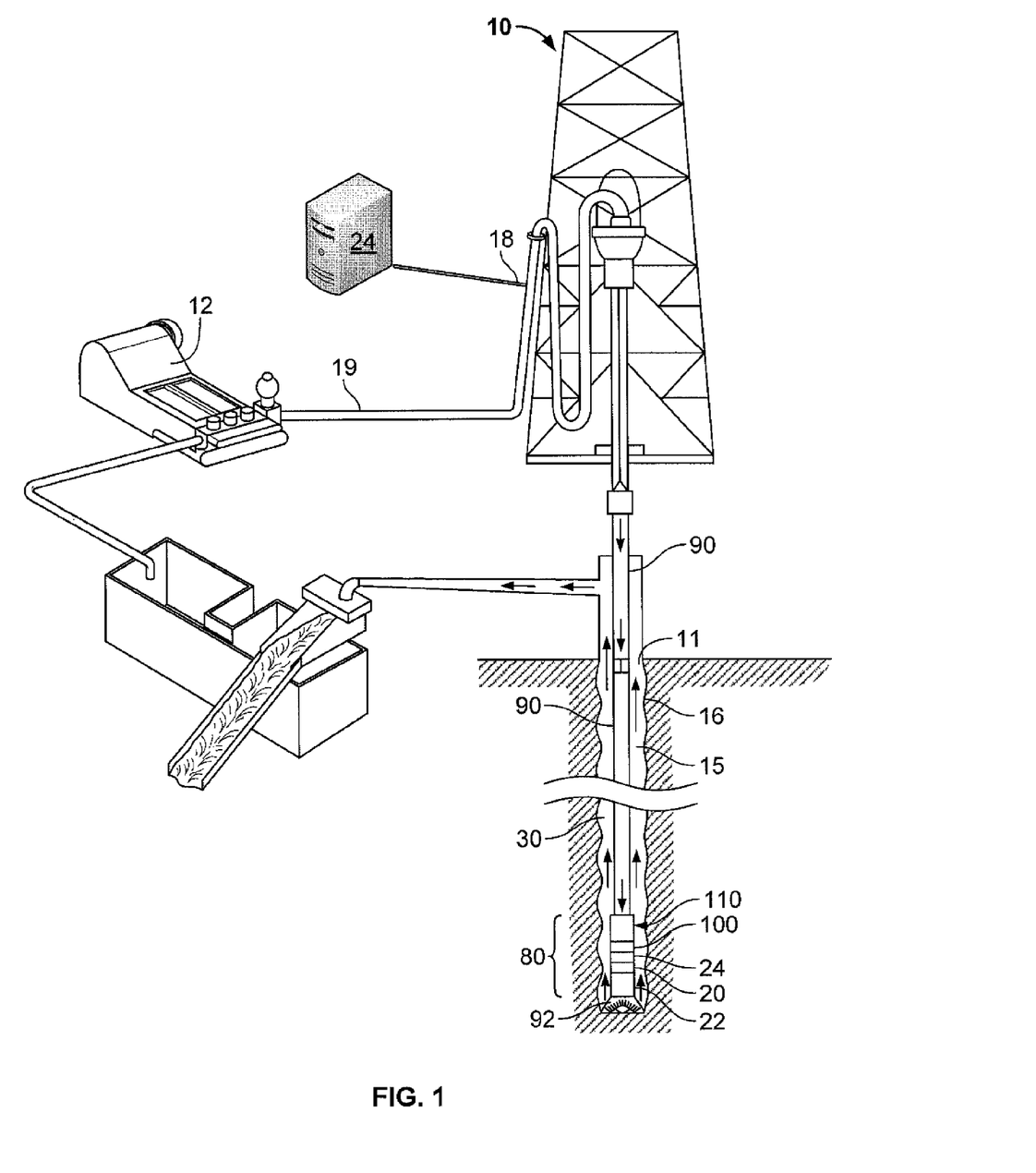
FIG. 1 illustrates a schematic diagram of a drilling rig engaged in drilling operations on a wellbore.

FIG. 1 illustrates a schematic diagram of a drilling rig 10 engaged in drilling operations on a wellbore 11. The drilling rig 10 may be powered by mechanical, electrical, hydraulic, pneumatic and other forms of energy source. The drilling rig 10 may use cable, metal drill pipe, plastic drill pipe, or coil tubing to raise and drop a drill bit 92 for drilling. In the example shown in FIG. 1, a pump 12 circulates drilling fluid 30 (also referred to in the art as drilling mud) through the drill string 90 down through the bottom hole assembly 80, through the drill bit 92 and back to the surface through the annulus 15 between the drill string 90 and the borehole wall 16.

The bottom hole assembly 80 may include any of a number of sensor modules 20, 22 and 24 which may include formation evaluation sensors and directional sensors. These sensors are well known in the art and are not described further. The bottom hole assembly 80 also contains a mud pulse telemetry tool 100 which induces pressure fluctuations in the drilling fluid. The pressure fluctuations, or pulses, propagate to the surface through the drilling fluid in the drill string 90 and are detected at the surface by any number of sensors 18 disposed on a discharge pipe 19 connected to the discharge side of the mud pump 12. It will be understood that the pressure sensors 18 may be located at another position in the piping system conveying the drilling fluid to the drill string 90 in the wellbore 11. The sensors 18 may be a pressure transducer or a similar device for measuring pulses generated by the bottom hole assembly 80 and transmitted up the column of drilling fluid to the surface. The transmission of data up the drill string via the drilling mud column is referred to in the art as mud pulse telemetry.

A control unit 24, which may be a computation device including processors, memories, input/output interfaces, and network communication, receives, processes and stores data transmitted by mud pulse telemetry to the sensor. The control unit 24 may output a signal to equipment in the wellbore or transmit received data to other locations remote from the control unit 24.

The control unit 24 may receive data such as rotational speeds and calculate actuation parameters and input for the mud pulse telemetry tool 100. The control unit 24 can control the mud pulse telemetry tool 100 to generate high rate pulse signals and receive the measured pressure fluctuation to analyze the drilling condition. The high pulse rate corresponds to a high sampling rate, which increases measurement resolution and allows for more detailed analysis of the characteristic information contained in the pressure fluctuation. For example, a common sampling rate of 4 bps at a drilling rate of 10 ft/min provides 24 bit/ft, whereas a 40 bps rate at 100 ft/min provides the same data rate per foot drilled.

Figure 2:
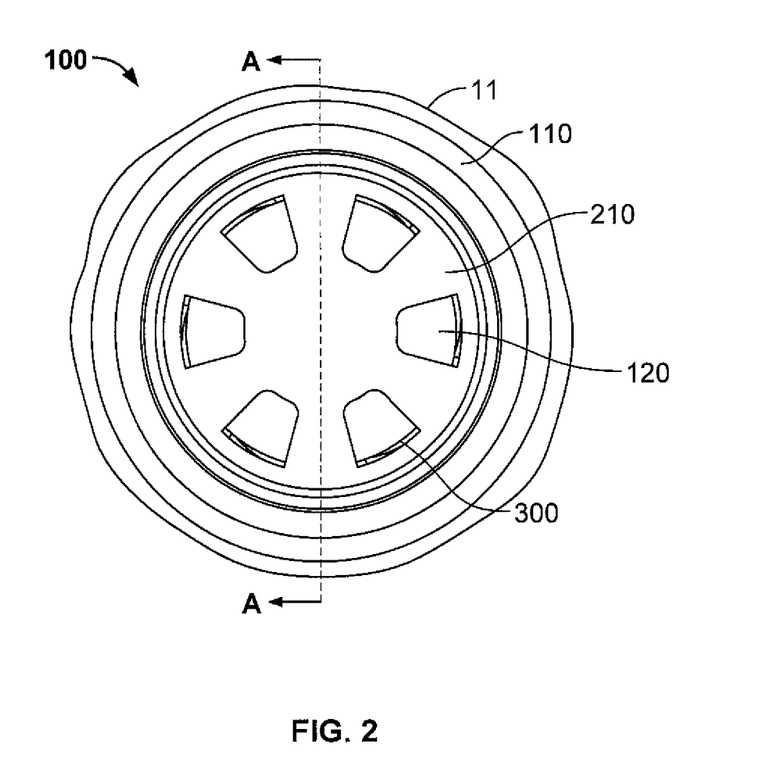
FIG. 2 is an end view of an example mud pulse telemetry tool in accordance with the present disclosure.

FIG. 2 is an end view of an example mud pulse telemetry tool 100 in accordance with the present disclosure. The end view is from above looking down the wellbore 11 and in the direction the drilling fluid is flowing inside down the drill collar 110 (i.e., the drilling fluid flows into the page). The drilling fluid may be the drilling fluid 30 as shown in FIG. 1. The drilling fluid enters and passes through a mud pulse stator 210 via a multiple-opening pulser drilling fluid passage 120 into a pulser 200 (shown in FIG. 3). A drive system 300 oscillates the pulser 200 to intermittently change the pulser drilling fluid passage 120 opening area to create various levels of flow restriction. Such flow restriction causes a pressure fluctuation in the drilling fluid. The pressure fluctuation is measured as mud pulse telemetry data. A section view A-A is shown in FIG. 3 to further illustrate the pulser 200 and the drive system 300.

The pulser drilling fluid passage 120 may be a number of openings of similar or different geometry distributed evenly or unevenly in the mud pulser stator 210. In the implementation shown in FIG. 2, the pulser drilling fluid passage 120 includes six openings of the same geometry distributed evenly in the mud pulse stator 210. The openings cover approximately the same area as the six supportive spokes so that a movable component (such as a valve) for closing up each opening can be positioned behind each spoke. In some implementations, there may be a different number of openings and spokes, such as 4, 8, 12, etc. An even distribution of the openings is preferred but not necessary. During operation, the movable component may rotate in a positive direction to close the pulser drilling fluid passage 120 and rotate in a negative direction to open it. This motion may be called oscillation and the oscillation angle may vary according to tool geometry.

Figure 3:
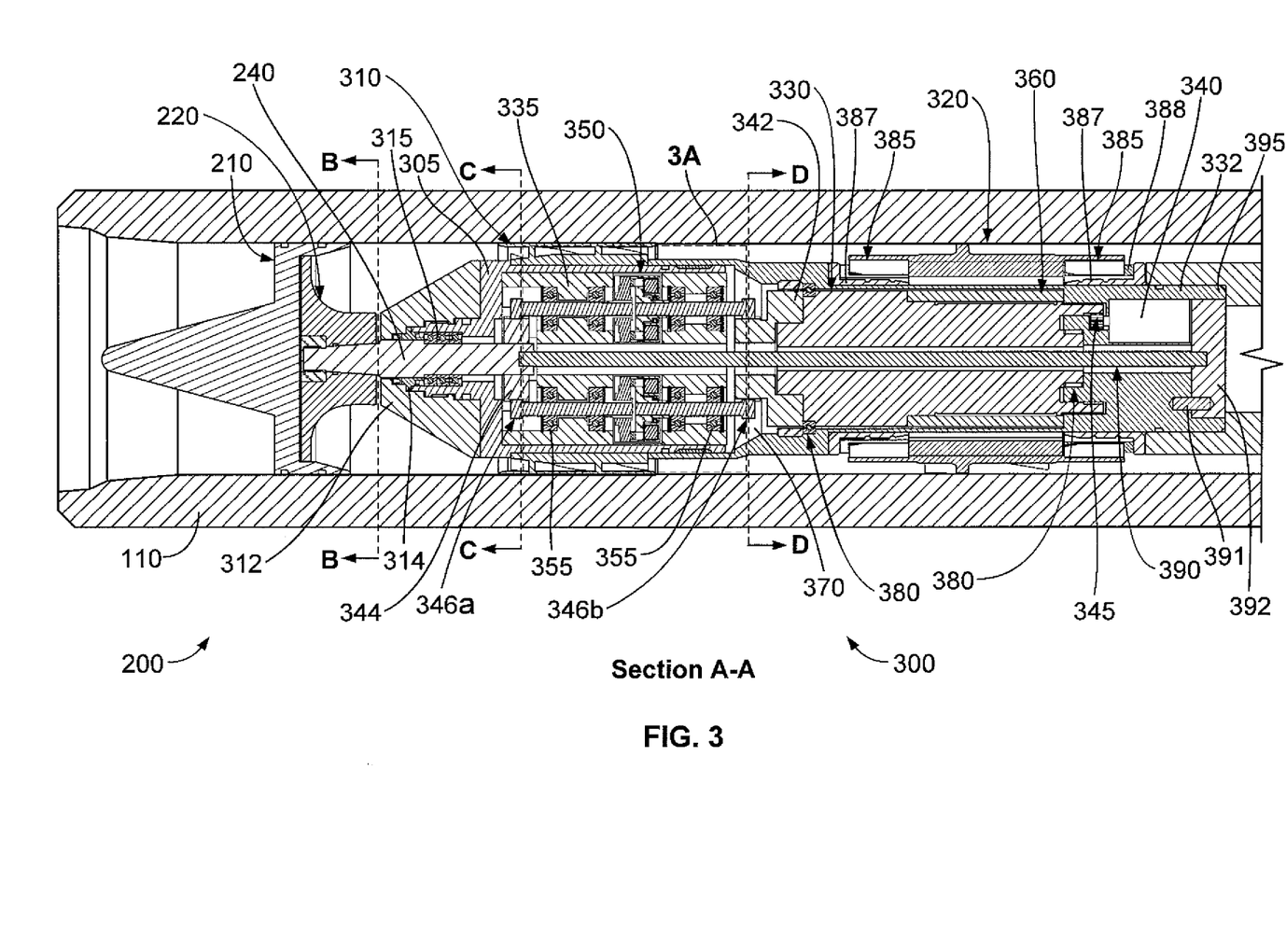
FIG. 3 is a cross-section view A-A of the example mud pulse telemetry tool in accordance with the present disclosure.

FIG. 3 is a cross-section view A-A of the example mud pulse telemetry tool 100 in accordance with the present disclosure. The mud pulse telemetry tool 100 can be used as the mud pulse telemetry tool 100 as shown in FIG. 1, used in the drill string 90 having the drilling fluid 30 flowing inside the drill collar 110. In the implementation shown in FIG. 3, the mud pulse telemetry tool 100 includes a pulser 200 and a drive system 300. The pulser 200 is driven by the drive system 300 to create different flow restriction levels for the drilling fluid. The pulser 200 includes a mud pulse stator 210 that is fixed inside the drill collar 110, and a mud pulse rotor 220 that is disposed proximate to the mud pulse stator 210 to form a variable pressure gap.

In the implementation shown in FIG. 3, the mud pulse stator 210 has a conical nose structure that diverts drilling fluid to the pulser drilling fluid passage 120. The conical nose structure may function similarly as a propeller nose cone: uniformly diverting incoming flows to circumferential directions. Because the diameter of the drill collar 110 is a constant value, the conical nose structure reduces the cross-sectional area as the drilling fluid approaches the pulser drilling fluid passage 120, therefore increasing the drilling fluid velocity as well as pressure.

The mud pulse rotor 220 may have a similar radial cross-section as the mud pulse stator. When the mud pulse rotor 220 is rotated against the mud pulse stator 210, the pulser drilling fluid passage 120 will be partially or fully closed. The mud pulse rotor 220 is placed behind the mud pulse stator 210 at a clearance referred to in the art as a "pressure gap," which can be adjusted for changing the amplitude of the pressure pulse. The mud pulse rotor 220 may be oscillating back and forth to close and open the pulser drilling fluid passage 120. The direction for the mud pulse rotor 220 to open the drilling fluid passage 120 may be defined as the positive rotation direction and the direction for closing may be defined as the negative rotation direction.

Physical stops and brakes may be installed on the mud pulse stator 210 to control the travel ends for the mud pulse rotor 220 and the acceleration/deceleration rates. For example, adjustable stops may be placed to prevent the mud pulse rotor 220 from fully closing the pulser drilling fluid passage 120. This adjustable stop can change the amplitude of the maximum positive pressure peak, i.e., a larger passage opening corresponds to a smaller pressure peak. Brakes may be used to change the timing of the pressure peak in one oscillation cycle, as well as the duration and the magnitude of the pressure peak. For example, longer brake duration may produce a lower pressure peak at longer occurrence duration.

The mud pulse rotor 220 is connected to the drive system 300 via a mud pulse rotor shaft 240. The mud pulse rotor shaft 240 transmits an actuation torque for closing the pulser drilling fluid passage 120 and a recovering torque for opening the pulser drilling fluid passage 120. The actuation torque is provided by a rotational output member 344 connected with a mechanical rotational energy source. The recovering torque is provided by a torsion bar 390 that releases the elastic energy stored when the torsion bar 390 is deformed as the mud pulse rotor shaft 240 rotates. The action of closing and opening the pulser drilling fluid passage 120 creates a pressure fluctuation (i.e., a pulse) that can be measured by telemetry sensors.

The telemetry data within the pressure fluctuation may include drilling mechanics information. For example, the telemetry data may include drilling mechanics information such as types and severity of vibration downhole, drilling fluid volume, etc. An operator may use the data to control the drilling operation for more efficient drilling and preventing tool failure.

In the implementation shown in FIG. 2, the mud pulse rotor 220 and the mud pulse stator 210 are used to generate positive pulses. At neutral position the mud pulse rotor 220 is positioned completely behind the mud pulse stator 210, creating a maximum drilling fluid passage 120. During pulse actuation, the mud pulse rotor 220 is actuated to partially or completely close the drilling fluid passage. This increases flow resistance and therefore the flow pressure, creating a positive pressure peak.

In some implementations, the mud pulse rotor 220 and the mud pulse stator 210 may be used to generate negative pulses. For example, the mud pulse rotor 220 may be set at a partially open position for drilling fluid to pass by. The mud pulse rotor 220 is then actuated to further open the drilling fluid passage 120 by the mud pulse rotor shaft 240. This creates a negative pressure pulse.

In some implementations, the mud pulse rotor 220 and the mud pulse stator 210 may be used to generate a continuous wave for telemetry measurements. For example, the mud pulse rotor 220 may continuously close and open the valve to generate pressure fluctuations such as a sinusoidal wave within the drilling fluid. Any digital modulation scheme with a continuous phase can be used to impose the information on a carrier signal (e.g., continuous phase modulation).

The drive system 300 includes a turbine stator 310, a turbine rotor 320, a rotatable inertial member 330 coupled to the turbine rotor 320, and a transmission that connects the inertial member 330 to the mud pulse rotor 220 via the mud pulse rotor shaft 240. The turbine stator 310 is integrated with a second stage flow diverter 312 that further diverts the drilling fluid passing the pulser 200. The second stage flow diverter 312 is placed immediately behind the mud pulse rotor 220 and forms a conical shape similar to the nose structure of the mud pulse stator 210. The second stage flow diverter 312 uniformly diverts incoming drilling fluid to the circumference where a regulatory structure of the turbine stator 310 performs regulating and filtering to the drilling fluid. The regulatory structure of the turbine stator 310 is supportively in contact with the drill collar 110 and affixes as well as centers the turbine stator 310 and other mechanical structures assembled with the turbine stator 310 to the drill collar 110.

The turbine stator 310 is integrated with an inertial member housing 332 that houses the inertial member 330, which is magnetically coupled with the turbine rotor 320 via a magnetic coupling 360. The turbine rotor 320 receives the accelerated, regulated and filtered drilling fluid from the turbine stator 310 and transforms partially the kinetic energy carried in the drilling fluid into rotational kinetic energy stored in the turbine rotor 320. The transformation process is similar to that of a wind turbine, in which the translation movement of fluid applies a pressure on the blades. The pressure on a surface area results in a force that includes a directional component driving the blade to rotate. The turbine rotor 320 is axially supported by at least two sets of bearings 385.

The bearings 385 can be axial rotation bearings, such as plain bearings, rolling-element bearings, fluid bearings, magnetic bearings, a combination of these and/or other bearings that support shaft rotation with insignificant friction. In the implementation shown in FIG. 3, the bearings 385 are rolling-element bearings. The turbine rotor 320 is supported by several rollers placed around the turbine rotor bearing seats 387, and insulated from drilling fluid by respective seals 388. In some implementations, the bearings 385 can be plain bearings, such as journal bearings, sleeve bearings, and rifle bearings. The contact between the plain bearings and the turbine rotor 320 may be well lubricated. In some implementations, the bearings 385 can be magnetic bearings, which suspend the turbine rotor 320 around the inertial member housing 332.

The turbine rotor 320 is coupled with the inertial member 330 via the magnetic coupling 360. The inertial member 330 can rotate freely on a number of inertial member bearings 380. The inertial member bearings 380 are placed near the two ends of the inertial member 330 and are installed in the inertial member housing 332. The magnetic coupling 360 may include several two-part members. Each of the two-part members has a first part installed onto the inertial member 330 and a second part (not shown) installed onto the turbine rotor 320. The first part and the second part attracts to each other via magnetic fields. For example, the first part's south pole may be positioned in proximity to and attracted to the second part's north pole and vice versa. In some implementations, the second part may be omitted if the turbine rotor 320 is made of magnetic materials, such as iron, hematite, permanent magnets, or other magnetic materials. In such case, the magnetic coupling 360 may include several one part members that perform as strong magnets and respectively turn the inertial member 330 and the turbine rotor 320 into the first part and the second part.

An array of the first parts may be installed at an even distributed interval onto the inertial member 330; and an array of the second parts may be installed at an even distributed interval onto the turbine rotor 320. During operation, the array of the second parts rotates along with the turbine rotor 320, generating a revolving magnetic field that attracts the first parts in the inertial member 330 to rotate in the same direction. The first parts and the second parts can be permanent magnets, electromagnets, and/or a combination of both. Permanent magnets may allow for a simpler and more reliable construction, while electromagnets may allow for better control authority (e.g., engaging magnitude, phase, etc.).

Because the magnetic coupling 360 is an indirect connection, each moving member may be allowed for sudden motion interruption without simultaneous impact on the other coupled member. For example, the inertial member 330 may experience sudden deceleration during operation when outputting energy to accelerate the mud pulse rotor 220; and the turbine rotor 320 may not experience similar sudden deceleration because of the indirect connection. This provides a smooth operation condition, without creating significant additional noise to the drilling fluid. On the other hand, the indirect connection renders a permanent phase lag for the inertial member 330, which does not have the working condition to reach the same speed as the turbine rotor 320.

The inertial member bearings 380 can be axial rotation bearings, such as plain bearings, rolling-element bearings, fluid bearings, magnetic bearings, a combination of these and/or other bearings that support shaft rotation with insignificant friction. In the implementation shown in FIG. 3, the inertial member bearings 380 are rolling-element bearings. The inertial member 330 is supported by several rollers placed inside the inertial member housing 332. In some implementations, the inertial member bearings 380 can be plain bearings, such as journal bearings, sleeve bearings, and rifle bearings. The contact between the plain bearings and the inertial member 330 may be well lubricated. In some implementations, the inertial member bearings 380 can be magnetic bearings, which suspend the inertial member 330 within the inertial member housing 332.

The inertial member 330 may be made of particularly dense materials such as lead, tungsten, zinc, copper, stainless steel, a combination of these or other metals that have a high density. In some implementations, the inertial member 330 may include several components, several layers of materials, and/or heterogeneous casting. For example, denser and more expensive material such as gold, platinum, rhodium, etc. may be used to form an outer layer or an outer component while less dense and lower cost material such as steel may be used to form the core. This can balance the needs for higher density and acceptable cost.

The inertial member 330 couples to a rotational input member 342 mechanically. For example, in the implementation shown in FIG. 3, the inertial member 330 internally engages the rotational input member 342 (e.g., with gear teeth). The rotational input member 342 engages a transmission at four, or any number, intermediate gear members 346b that are supported by gear member bearings 355. The rotational energy transfers from the inertial member 330 to the rotational input member 342, then to the intermediate gear members 346b. This energy is further transferred to another four, or any number, intermediate gear members 346a when a set of four, or any number, clutches 350 are engaged. The intermediate gear members 346a then transfer the energy to a rotational output member 344. The rotational output member 344 then transfers the energy to the mud pulse rotor shaft 240, which is supported by a number of mud pulse rotor shaft bearings 315 and sealed by a mud pulse rotor shaft seal 314.

In the implementation shown in FIG. 3, the mud pulse rotor shaft bearings 315 only constrain and support the mud pulse rotor shaft 240 radially and the mud pulse rotor shaft 240 can move in its axial direction. In some other implementations, the mud pulse rotor shaft bearings 315 may be axially constrained for sliding the entire rotor and drive assembly axially with a ball screw and another motor inside collar to adjust the pressure gap. The mud pulse rotor shaft seal 314 seals the internal transmission of the drive system against potential contamination from the drilling fluid entering the mud pulse rotor 220. Therefore, the inertial member 330 has transferred part of the kinetic energy of drilling fluid from the turbine rotor 320 to the rotational input member 342, then to the intermediate gear members 346b and 346a coupled via a set of clutches 350, to the rotational output member 344, and finally, to the mud pulse rotor shaft 240 and the mud pulse rotor 220.

Data transmission is produced by controlling the opening and closing motion of the mud pulse rotor 220. One major component of the effective data rate of the pulser is the time period to open and close the mud pulse rotor 220 (or a similar valve in general). The moment of inertia of the mud pulse rotor 220 and the actuation torque available determine the acceleration rate for this oscillation operation. By utilizing the stored kinetic energy of the inertial member 330, an instantaneous large torque can be supplied to the mud pulse rotor 220, therefore increasing acceleration rates. In the implementation shown in FIG. 3, the transfer of the stored kinetic energy is conducted by a direct drive train of gears and clutches (such as the intermediate gear members 346a and 346b, and the clutches 350). In some implementations, other power transmission schemes are possible. The clutch 350 includes one or multiple clutches to switch the power transmission between the inertial member 330 and the mud pulse rotor 220. In some implementations, multiple clutches can be used to switch on or off in a controlled timing sequence to improve the pulse rate and disregard the possibly slower rate of charge or discharge time of the clutch device.

The gear member bearings 355 and the mud pulse rotor shaft bearings 315 can be axial rotation bearings, such as plain bearings, rolling-element bearings, fluid bearings, magnetic bearings, a combination of these and/or other bearings that support shaft rotation with insignificant friction. In the implementation shown in FIG. 3, both the gear member bearings 355 and the mud pulse rotor shaft bearings 315 are rolling-element bearings. The intermediate gear members 346a and 346b are supported by several roller balls placed into the gear housing 335. Each intermediate gear member is allowed to translate along the axial direction. The mud pulse rotor shaft 240 is supported by at least three sets of ball bearings lined up to receive loading in the radial direction.

In some implementations, the gear member bearings 355 and the mud pulse rotor shaft bearings 315 can be plain bearings, such as journal bearings, sleeve bearings, and rifle bearings. The contact between the plain bearings and the intermediate gear members 346a and 346b, as well as the mud pulse rotor shaft 240, may be well lubricated. In some implementations, the gear member bearings 355 and the mud pulse rotor shaft bearings 315 can be magnetic bearings, which suspend the intermediate gear members 346a and 346b, as well as the mud pulse rotor shaft 240, within the gear member bearings 355 and the mud pulse rotor shaft bearings 315.

The gear member bearings 355 are installed in the gear housing 335 that is integrated with the turbine stator 310. The gear housing 335 may contain a number of seating chambers for the gear member bearings 355. For example, in the implementation shown in FIG. 3, the gear housing 335 contains 16 seating chambers for 16 gear member bearings 355. The bearings 355 allow the intermediate gear members 346a and 346b to move axially so that the gear members 346a and 346b can be coupled and decoupled by actuation of the clutch 350.

The turbine rotor 320 transmits the rotational energy absorbed from the passing drilling fluid to the inertial member 330. In the implementation shown in FIG. 3, a supplemental motor 340 can further supplement rotational energy to the inertial member 330 to achieve a desired rotating speed. The supplemental motor 340 can be engaged with the inertial member 330 by a gear set 345 at the rear end. The supplemental motor 340 is installed in the inertial member housing 332 that is affixed to an inertial member housing base 395. The inertial member housing base 395 can be affixed to the drill collar 110 via other structures (not shown). The turbine stator 310 and the inertial member housing base 395 affix the drive system 300 to the mud pulse telemetry tool 100.

A speed sensor 370 may be installed near the rotational input member 342 in the transmission housing 305 for monitoring the operation speed of the rotatable inertial member 330. The speed sensor 370 may be a magnetic inductive sensor that includes a permanent magnet surrounded by a coil of wire. The speed sensor 370 may maintain an air gap from the teeth of the rotational input member 342. The output voltage of the speed sensor 370 varies along with the rotational speed of the input member 342, hence indicating the rotational speed. Other types of speed sensors, such as optical sensors, may also be used.

The speed data collected by the speed sensor 370 may be used to process the operating condition of the inertial member 330. The processed result may be used to generate activation signals to at least one of the clutches 350. The processed result may also be used to determine if the supplemental motor 340 needs to be activated to supplement power for the inertial member 330 to stay at certain rotational speed.

At the rear end, the inertial member housing 332 envelops a torsion bar base 392 that, with an adjustment screw 391, can change the relative position between the inertial member housing 332 and the inertial member housing base 395. The torsion bar base 392 connects to the mud pulse rotor 220 via a torsion bar 390 and the mud pulse rotor shaft 240. Therefore, the adjustment screw 391, by changing the relative position between the inertial member housing 332 and the inertial member housing base 395, can indirectly change the relative position (i.e., the pressure gap) of the mud pulse rotor shaft 240 and the mud pulse rotor 220 with respect to the mud pulse stator 210. In some embodiments, the entire drive and rotor assembly with axially constrained 315 bearings may slide inside the collar in order to adjust pressure gap.

The inertial member housing 332 supports the turbine rotor bearing seats 387, which receive the turbine rotor bearings 385 for the turbine rotor 320. The turbine rotor bearings 385 support the turbine rotor 320 radially. The bearings 385 can be axial rotation bearings, such as plain bearings, rolling-element bearings, fluid bearings, magnetic bearings, a combination of these and/or other bearings that support shaft rotation with insignificant friction. In the implementation shown in FIG. 3, the bearings 385 are rolling-element bearings. The turbine rotor 320 is supported by several rollers placed around the turbine rotor bearing seats 387, and insulated from drilling fluid by respective seals 388. In some implementations, the bearings 385 can be plain bearings, such as journal bearings, sleeve bearings, and rifle bearings. The contact between the plain bearings and the turbine rotor 320 may be well lubricated. In some implementations, the bearings 385 can be magnetic bearings, which suspend the turbine rotor 320 around the inertial member housing 332.

During operation, the drilling fluid enters the mud pulse stator 210 via the drilling fluid passages 120. The mud pulse rotor 220 closes and opens the drilling fluid passages 120 in an oscillatory manner. The mud pulse rotor 220 is actuated by the mud pulse rotor shaft 240, which receives rotation power from the rotational output member 344. The rotational output member 344 is actuated by the rotational input member 342 via a transmission mechanism that involves intermediate gear members 346a and 346b and clutches 350. The rotational input member 342 is integrated with the inertial member 330 that is magnetically coupled with the turbine rotor 320 and mechanically coupled with the supplemental motor 340. The turbine rotor 320 transfers a portion of the kinetic energy of the drilling fluid to the rotating kinetic energy of the inertial member 330.

The inertial member 330 has significantly larger inertia relative to the mud pulse rotor 220 and the drive train from the rotational input member 342 to the mud pulse rotor shaft 240. This allows the rotating inertial member 330 to serve as a momentum reservoir. When the clutches 350 engages the drive chain between the inertial member 330 and the mud pulse rotor 220, a large acceleration can be obtained for the mud pulse rotor 220. This enables a much shorter ramp up time for the mud pulse rotor 220 to move from the neutral position to a closed position. The torsion bar 390 is elastically deformed in the actuation process. When the clutches 350 disengage to release the mud pulse rotor 220, the torsion bar 390 releases the stored elastic energy and returns the mud pulse rotor 220 back to the neutral position.

The components illustrated in FIG. 3 can be made of materials that are strong enough to perform their function. For example, the torsion bar 390 should be made of a material, under certain design parameters, that when loaded will return the mud pulse rotor back to the open position, but will not allow plastic deformation to occur.

Figure 3A:
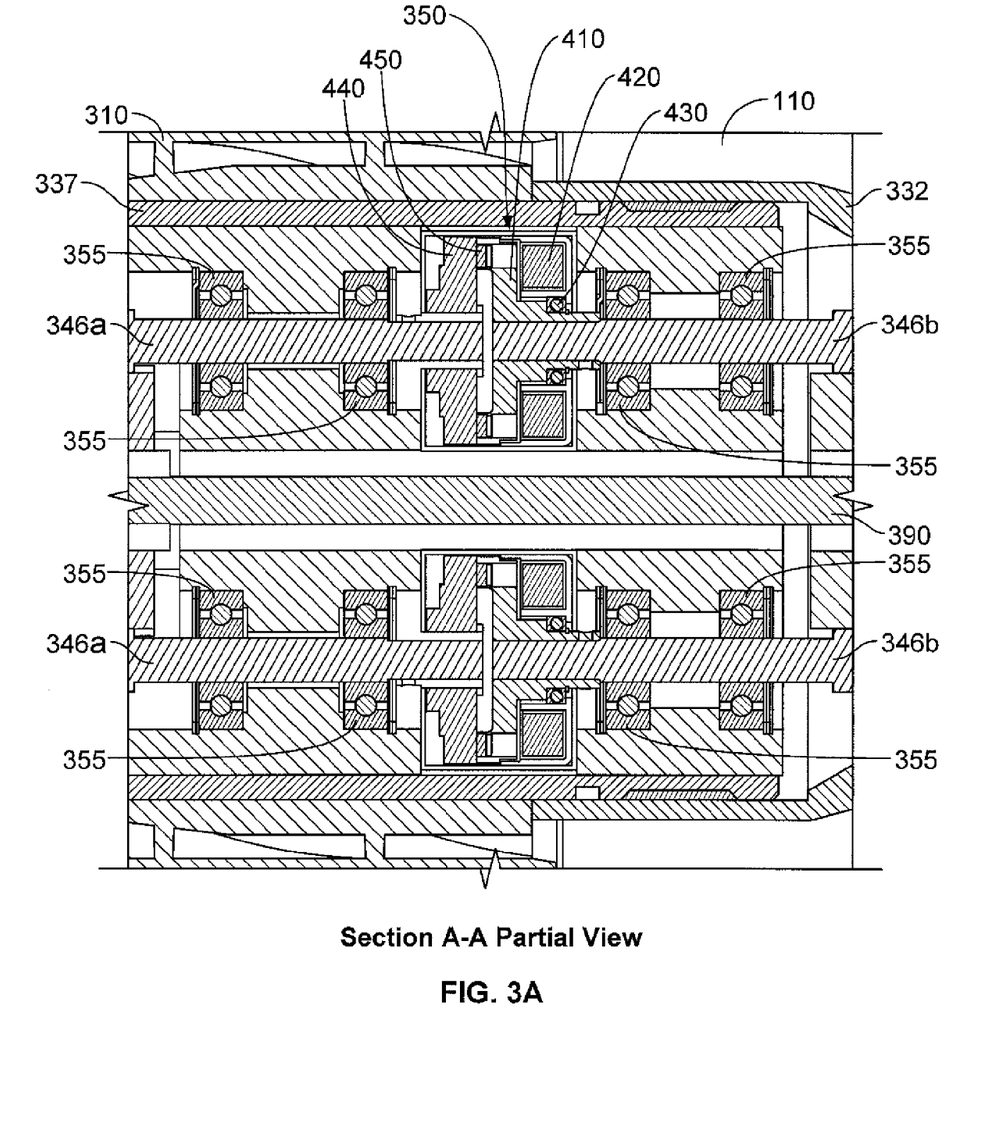
FIG. 3A is an enlarged partial view of the cross-section A-A of FIG. 3.

FIG. 3A is an enlarged view of a local section A-A of the example mud pulse telemetry tool 100 in accordance with the present disclosure. The enlarged view shows the details of one embodiment of the clutch 350 used to couple and decouple the intermediate gear members 346a and 346b. Four clutches 350 are used for four sets of intermediate gear members 346a and 346b. Each clutch 350 includes a receptive clutch coupler 410, a protrusive clutch coupler 440, a clutch bearing 430, and a clutch actuator 420. The receptive clutch coupler 410 can be coupled with the protrusive clutch coupler 440 by engaging the teeth 450 of the protrusive clutch into the receptive clutch coupler 410. During operation, the clutch actuator 420 translates the receptive clutch coupler 410 that is integrated with the intermediate gear member 346b in the axial direction to engage with the protrusive clutch coupler 440.

The clutch actuator 420 may be pre-spring-tensioned so that when the clutch actuator 420 is turned off, the receptive clutch coupler 410 may be returned to the original position under the actuation of a spring. The clutch bearing 430 allows the pre-tensioned spring to act on the intermediate gear member 346b without creating significant friction in the axial direction. The receptive clutch coupler 410 may be integrated with the intermediate gear member 346b by using hexagonal cross-section fitting, key fitting, or other connections that prevent relative rotation movement. Similarly, the protrusive clutch coupler 440 may be integrated with the intermediate gear member 346a by using hexagonal cross-section fitting, key fitting, or other connections that prevent relative rotation movement.

In some implementations, the clutch 350 may use other types of clutches, such as friction or magnetic clutches, that couple two shafts with frictional plates when engaged. Various materials can be used for such disc friction facings, typically a compound organic resin with copper wire facing or a ceramic material.

Figure 4:
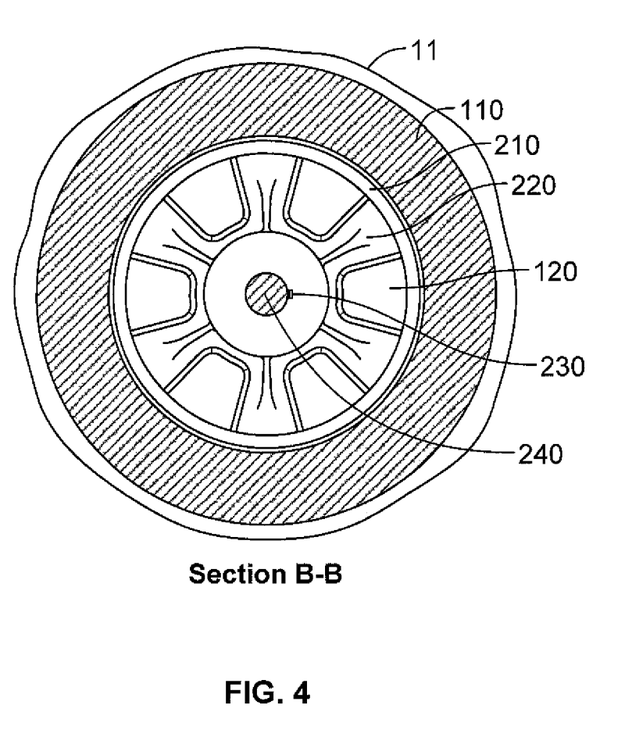
FIG. 4 is a cross-section view B-B of the example mud pulse telemetry tool in accordance with the present disclosure.

FIG. 4 is a cross-section view B-B of the example mud pulse telemetry tool 100 in accordance with the present disclosure. In this perspective the mud fluid flows out of the page. In some implementations, the mud pulse rotor 220 may have rib reinforcement structure so that less material is used and the total weight of the mud pulse rotor 220 can be reduced. This also allows the mud pulse rotor 220 to have a small inertia that is proportional to its mass and to be more responsive to actuation input.

The mud pulse rotor shaft 240 transmits torque to the mud pulse rotor 220 with a mud pulse rotor key 230. The mud pulse rotor key 230 may be a parallel key, a Woodruff key, a tapered key, or other types of keys (such as a scotch key, for example). The connection between the shaft and rotor may also utilize spline or shrink fit interface, and/or other similar techniques.

Figure 5:
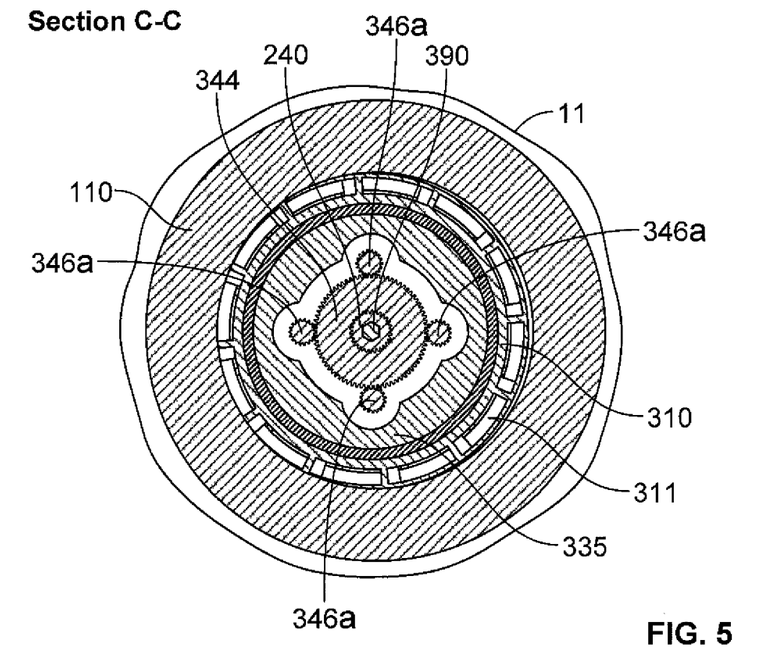
FIG. 5 is a cross-section view C-C of the example mud pulse telemetry tool in accordance with the present disclosure.

FIG. 5 is a cross-section view C-C of the example mud pulse telemetry tool 100 in accordance with the present disclosure. Four intermediate planetary gear members 346a are evenly distributed around the sun gear attached to the rotational output member 344. In some implementations, a different number of intermediate gear members 346a may be used, such as 8, 12, etc. An increased number may allow for transmission of higher torque; however, it may also increase system complexity therefore lowering reliability and increasing cost. The torsion bar 390 is coupled with the rotational output member 344 by using a hexagonal cross-section. The gear housing 335 may enclose the intermediate gear members at a clearance that enables designed lubrication. For example, the clearance may be smaller if viscous lubricant is used for long maintenance intervals, and the clearance may be larger if less viscous lubricant is used for high speed operations.

The turbine stator 310 is installed onto the transmission housing 305 and is fixed relative to the drill collar 110. The turbine stator 310 may have a number of blades evenly distributed along the circumference inside the drill collar 110. In the implementation shown in FIG. 6, the turbine stator 310 has 12 narrow blades that each forms a helical shape to receive incoming drilling fluid. The blades of the turbine stator force the drilling fluid to conform with the helical shape to apply a rotating velocity to the drilling fluid. The accelerated rotational velocity will later act upon the turbine rotor 320 to achieve a more efficient operation. In some implementations, the turbine stator 310 can have a different number of blades and each blade can have a different helical shape or pitch, determined by the anticipated drilling fluid velocity, density, viscosity and other physical factors. For example, for drilling fluid with relatively high velocity, low density, and/or low viscosity, a large number (i.e., 15, 20, etc.) and lower pitch of helical blades may improve performance, and vice versa.

Figure 6:
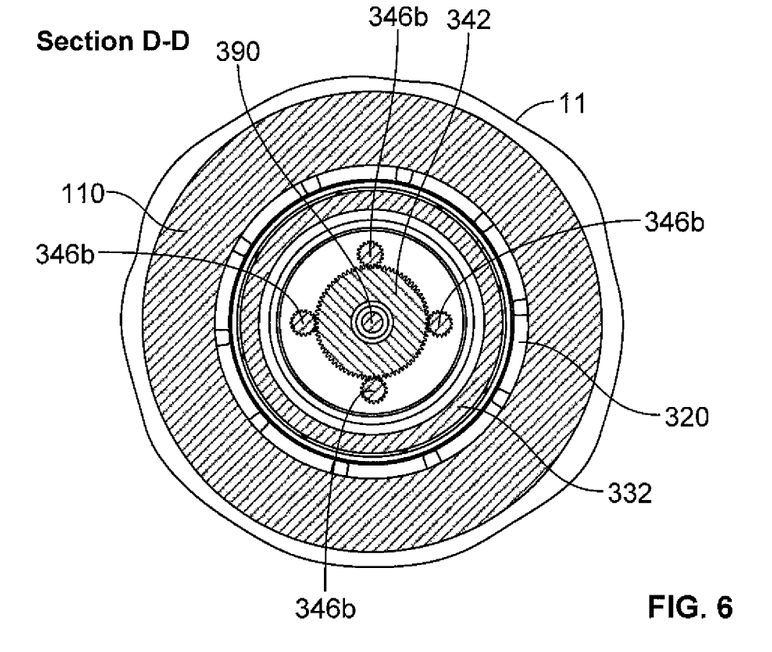
FIG. 6 is a cross-section view D-D of the example mud pulse telemetry tool in accordance with the present disclosure.

FIG. 6 is a cross-section view D-D of the example mud pulse telemetry tool 100 in accordance with the present disclosure. Another four intermediate planetary gear members 346b are evenly distributed around a sun gear attached to the rotational input member 342. In some implementations, a different number of intermediate gear members 346b may be used, such as 8, 12, etc. An increased number may allow for transmission of higher torque; however, it may also increase system complexity therefore lowering reliability and increasing cost. The torsion bar 390 is decoupled and disengaged from the rotational input member 342 by using a circular opening for clearance cross-section (i.e. the cylindrical interior of the rotational input member 342 can rotate freely with respect to the cylindrical exterior of the torsion bar 390 at a substantial clearance). The inertial member housing 332 and the transmission housing 305 may enclose the intermediate gear members in a chamber that enables desired lubrication.

The turbine rotor 320 is rotating freely around the inertial member housing 332. The turbine rotor 320 is actuated by the drilling fluid (which is flowing downhole in a direction illustrated as into the page). The turbine rotor 320 may have a number of blades evenly distributed along the circumference inside the drill collar 110. In the implementation shown in FIG. 6, the turbine rotor 320 has 10 narrow blades that each forms a helical shape to receive incoming drilling fluid. The drilling fluid acts on the blades and causes the turbine rotor 320 to rotate, because the drilling fluid is forced to change direction of its momentum when following the helical shape, creating a force component that applies a torque for rotation on the turbine rotor 320. In some implementations, the turbine rotor 320 can have a different number of blades and each blade can have a different helical shape or pitch, determined by the anticipated drilling fluid velocity, density, viscosity and other physical factors. For example, for drilling fluid with relatively high velocity, low density, and/or low viscosity, a large number (i.e., 12, 16, etc.) and lower pitch of helical blades may improve performance, and vice versa.

Figure 7:
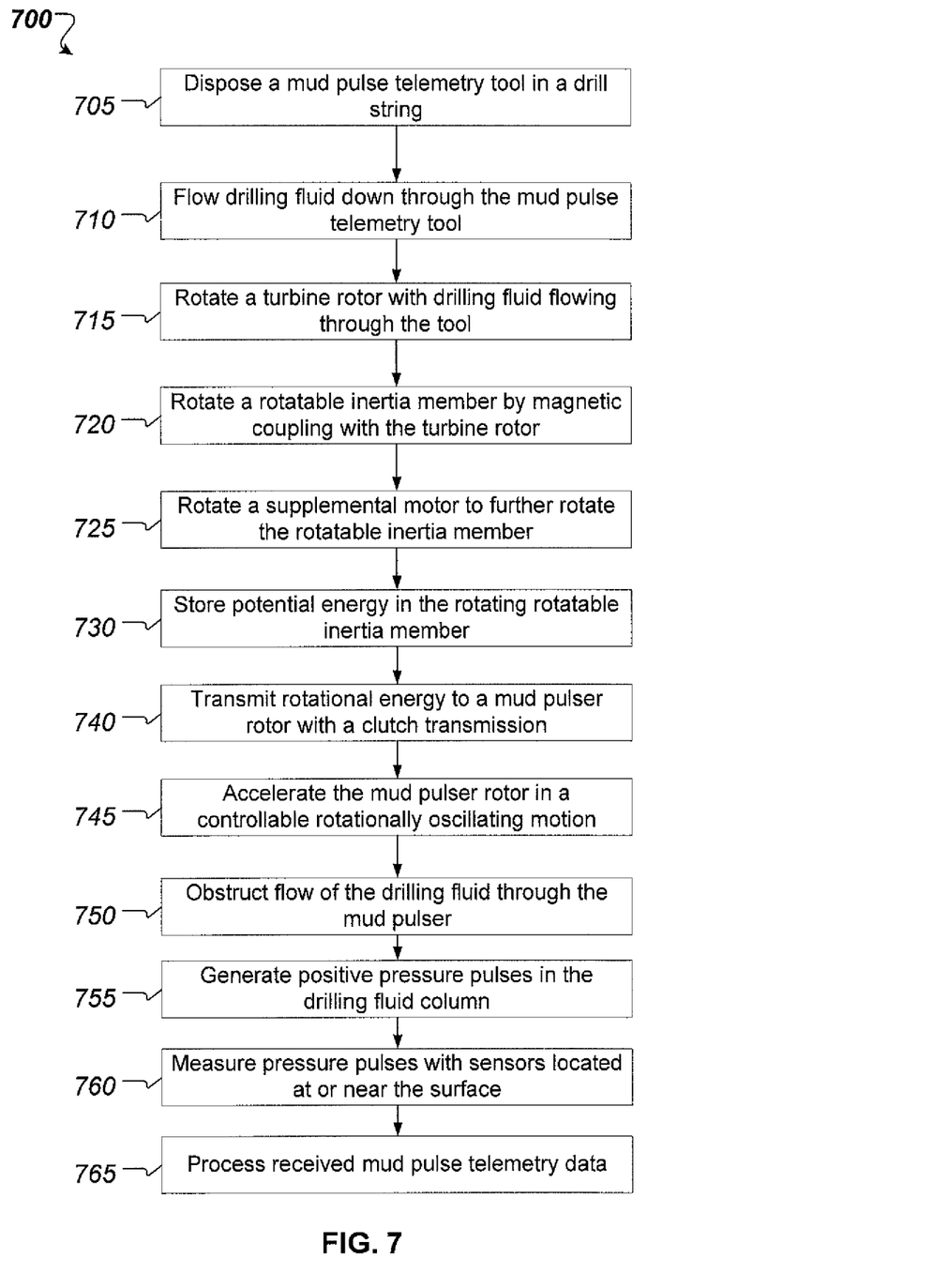
FIG. 7 illustrates example methods of using the example mud pulse telemetry tool for generating a high sampling rate signal in accordance with the present disclosure.

FIG. 7 illustrates example methods of using the example mud pulse telemetry tool for generating high sampling rate signals in accordance with the present disclosure. At step 705, a mud pulse telemetry tool, such as the mud pulse telemetry tool 100 in FIG. 1, is disposed in a drill string. The mud pulse telemetry tool may include a mechanism that generates pressure fluctuation in drilling fluids, a sensing device that measures speeds and pressure, and an actuation device that actuates the pulse telemetry tool. For example, the mechanism generating pressure fluctuation may be the pulser 200, and the actuation device may be the drive system 300 of FIG. 3.

At step 710, drilling fluid is flowed down through the mud pulse telemetry tool. The drilling fluid can be water-base fluids, non-water base fluids and pneumatic fluids. For example, the drilling fluids can be water, salt water, and other water-based fluids (such as colloidal clay, clay and polymer, and polymer fluids). The drilling fluids can also be a synthetic fluid (such as the vegetable esters, poly alpha olefins, internal olefins, linear alpha olefins, synthetic paraffins, ethers, and linear alkylbenzenes), diesel oil, mineral oil and other non-water based fluids. Pneumatic fluids may include dry gas, mist, foam, gasified mud and/or other types.

At step 715 drilling fluid rotates a turbine rotor of the mud pulse telemetry tool. The turbine rotor absorbs a portion of the kinetic energy of the passing drilling fluid into rotation. Via magnetic coupling, at step 720, the turbine rotor transfers the rotation energy to a rotatable inertia member. The rotatable inertia member is also connected to a supplemental motor. This connection could be direct, magnetic, or friction clutch, etc. The supplemental motor can assist with initial startup of the inertia member and/or to provide supplemental rotational energy to reach a desired rotational speed. Therefore, at step 725, the supplemental motor can be rotated to assist with rotation of the rotatable inertia member.

At step 730, the rotating rotatable inertia member has reached a desired rotational speed and a certain amount of kinetic energy is stored in the inertia member. At this step, the kinetic energy is quantified by the rotational speed of the inertia member. This may be accomplished by using a rotational speed sensor for the measurement, such as using the rotational speed sensor 370 in the implementation illustrated in FIG. 3. The quantification process may include outputting data including the rotational speed of the rotating inertia member from the sensor and receiving the rotational speed data in a processor. In some implementations, the processor subsequently calculates and outputs an activation signal for a clutch transmission so that, for example as shown in FIG. 3, the clutch transmission 350 can be engaged to transfer rotational energy from the rotatable inertia member 330 to the mud pulse rotor 220.

Then at step 740, the rotational energy is transmitted to a mud pulser rotor with a clutch transmission. After the quantification process from the last step 730, the processor can then calculate and output an activation signal for at least one clutch so that the clutch can transfer synchronized bursts of rotational energy from the rotatable inertia member to the mud pulse rotor. This accelerates the mud pulse rotor in a controllable rotationally oscillating motion at step 745. In some implementations, additional clutches may be provided for reducing recharge time. A processor may be used to calculate a time period for the clutch to engage based on the input data on the speed of rotation and mass of the rotatable inertia member. By utilizing the energy stored in the rotating inertia member, the ramp up time for rotating the mud pulse rotor can be significantly reduced. Therefore, the energy stored in the rotating rotatable inertia member also speeds up pulse initiation.

At step 750, the mud pulse rotor closes the drilling fluid passage and therefore obstructs flow of the drilling fluid through the mud pulser. This creates a positive pressure pulse fluctuation at step 755. Oscillation of the mud pulse rotor creates a series of pressure pulses that are measured with pressure sensors at step 760. At step 765, the measured data is processed. In between pulses, an elastic deformable torsion bar coupled to the mud pulser is provided for rotating the mud pulser from an oscillated (closed) position back to a neutral (open) position using elastic energy stored in the torsion bar.

A number of implementations have been described. Nevertheless, it will be understood that various modifications may be made. Further, the method 300 may include fewer steps than those illustrated or more steps than those illustrated. In addition, the illustrated steps of the method 300 may be performed in the respective orders illustrated or in different orders than that illustrated. As a specific example, the method 300 may be performed simultaneously (e.g., substantially or otherwise). Other variations in the order of steps are also possible. Accordingly, other implementations are within the scope of the following claims.

What is claimed is:

1. A mud pulse telemetry tool for use in a drill string having a drilling fluid flowing therein, said tool comprising:
   a pulser disposed in said drill string, the pulser including:
      a non-rotating mud pulse stator, and
      a mud pulse rotor disposed proximate to the stator; and
   a drive system, said drive system comprising:
      a turbine stator,
      a turbine rotor,
      a generally cylindrical rotatable inertial member formed from a high density material, said rotatable inertial member magnetically coupled to the turbine rotor, said inertial member operatively connected at a first end to the mud pulse rotor; said rotatable inertial member when rotating having a larger inertia than an inertia of the mud pulse rotor;
      a transmission disposed intermediate between the mud pulse rotor and the turbine rotor, said transmission having a first rotational input member, a rotational output member, and a gear set disposed intermediate between first rotational input member and the rotational output member, said gear set including at least one intermediate member disposed between the first rotational input member and the rotational output member, and a plurality of clutches adapted to engage and disengage the intermediate member to transfer synchronized bursts of rotational energy from the rotatable inertial member to the mud pulse rotor; and
   a processor and a rotational speed sensor, said rotational speed sensor operable to output data on a rotational speed of the rotatable inertial member to the processor, said processor operable to calculate a time period for at least one of the plurality of clutches to engage the intermediate member of the gear set based on the data on the rotational speed and mass of the rotatable inertia member and output a signal to activate at least one of the plurality of clutches to engage the intermediate member of the gear set for the time period and transfer rotational energy from the rotatable inertial member to the mud pulse rotor.

2. The tool of claim 1 wherein rotational energy is transmitted from the turbine rotor of the drive system to the rotatable inertial member by a magnetic coupling.

3. The tool of claim 1 wherein the rotatable inertial member is operatively connected at a second end to a supplemental motor.

4. The tool of claim 3 wherein the supplemental motor is adapted to supplement rotational energy imparted to the rotatable inertial member by the drive system.

5. The tool of claim 1 further including an elastically deformable torsion bar disposed between a base of the torsion bar and a shaft of the mud pulse rotor, said torsion bar adapted to deform and to store elastic energy when the torsion bar is transmitting torque from the base of the torsion bar to the shaft of the mud pulse rotor, and release said stored elastic energy to provide a reverse rotation recovering torque.

6. A method of mud pulse telemetry for use in a drill string having a drilling fluid flowing therein, said method comprising:
   disposing a mud pulse telemetry tool in the drill string, wherein said mud pulse telemetry tool includes:
      a mud pulser having a non-rotating mud pulse stator, and
         a mud pulse rotor positioned proximate to the stator,
      a drive system having a turbine stator, a turbine rotor, and a general cylindrical rotatable inertial member having a mass greater than a mass of the mud pulse rotor,
      a gear set disposed intermediate between the mud pulse rotor and the turbine rotor, said gear set having a first rotational input member and at least one rotational output member, at least one intermediate gear member disposed between the input member and the output member of the gear set, and a plurality of clutches operatively connected to the at least one intermediate gear member of gear set;

flowing the drilling fluid down the drill string and through the mud pulse telemetry tool;
rotating the turbine rotor with drilling fluid flowing through the tool;
rotating the rotatable inertia member by magnetic coupling of the member to the rotating turbine rotor of the drive system and creating an inertia of the rotatable inertia member that is greater than an inertia of the mud pulse rotor;
storing potential energy as rotational energy in the rotating rotatable inertia member;
transmitting the rotational energy from the rotatable inertia member to the mud pulse rotor;
outputting data including a rotational speed of the rotating inertia member from a rotational speed sensor;
receiving the rotational speed data in a processor;
calculating a time period for at least one of the plurality of clutches to engage based on the data on the rotational speed and mass of the rotatable inertia member;
outputting from the processor an activation signal for at least one clutch of the plurality of clutches;
receiving the activation signal in the at least one clutch and engaging the clutch with the at least one gear member;
transferring synchronized bursts of rotational energy from the rotatable inertial member to the mud pulse rotor via the clutch and gear set;
accelerating and decelerating the mud pulse rotor in a rotationally oscillating motion;
restricting and unrestricting flow of the drilling fluid through the mud pulse stator; and
generating a plurality of controlled time-based pressure pulses in the drilling fluid in the drill string.

7. The method of claim 6 further including:
rotating a supplemental motor coupled to the rotatable inertia member to add rotational energy to the rotatable inertia member.

8. The method of claim 6 further comprising:
reducing ramp up time for rotating the mud pulse rotor due to the greater inertia of the rotating inertia member than the inertia of the rotating mud pulse rotor.

9. The method of claim 6 further comprising:
speeding up pulse initiation by utilizing potential energy stored in the rotating rotatable inertia member.

10. The method of claim 6 further including:
providing additional clutches to reduce recharge time of the clutch.

11. The method of claim 6 further including:
providing an elastic deformable torsion bar coupled to the mud pulser; and
rotating the mud pulser from an oscillated position back to a neutral position using elastic energy stored in the torsion bar.

12. The tool of claim 1 wherein the rotatable inertia member is formed from a first material having a density greater than a density of a material from which the mud pulse rotor is formed.

* * * * *

UNITED STATES PATENT AND TRADEMARK OFFICE
CERTIFICATE OF CORRECTION

| | | |
|---|---|---|
| PATENT NO. | : 9,000,939 B2 | Page 1 of 1 |
| APPLICATION NO. | : 13/545356 | |
| DATED | : April 7, 2015 | |
| INVENTOR(S) | : Mark A. Sitka, Kristopher Sherrill and Daniel Martin Winslow | |

It is certified that error appears in the above-identified patent and that said Letters Patent is hereby corrected as shown below:

On the title page item 30 Column 1, please insert Applicant's claim for foreign priority
-- International Application Serial No. PCT/US2011/053476, filed on 09/27/2011 --

On the title page item 56 Other Publications, Line 2, please replace "PCT/US1022/053476" with -- PCT/US2011/053476 --

Signed and Sealed this
First Day of March, 2016

Michelle K. Lee
*Director of the United States Patent and Trademark Office*